United States Patent
Suzuki et al.

(10) Patent No.: US 8,928,987 B2
(45) Date of Patent: Jan. 6, 2015

(54) MICROSCOPE OBJECTIVE LENS

(71) Applicant: Olympus Corporation, Tokyo (JP)

(72) Inventors: Yoshimasa Suzuki, Kanagawa (JP); Kazuo Kajitani, Tokyo (JP); Hisashi Goto, Tokyo (JP); Hisashi Ode, Tokyo (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 13/755,264

(22) Filed: Jan. 31, 2013

(65) Prior Publication Data

US 2013/0194678 A1     Aug. 1, 2013

(30) Foreign Application Priority Data

Jan. 31, 2012    (JP) .................. 2012-018988
Dec. 12, 2012    (JP) .................. 2012-271025

(51) Int. Cl.
*G02B 21/02*    (2006.01)

(52) U.S. Cl.
CPC .................. *G02B 21/02* (2013.01)
USPC ....................................... 359/656

(58) Field of Classification Search
USPC ................................. 359/656–661
See application file for complete search history.

(56) References Cited

U.S. PATENT DOCUMENTS

| 6,075,656 A * | 6/2000 | Bietry et al. .................. 359/717 |
| 2006/0103921 A1* | 5/2006 | Karaki .......................... 359/368 |
| 2011/0235170 A1* | 9/2011 | Kawasaki ..................... 359/385 |

FOREIGN PATENT DOCUMENTS

JP    2006-065023    3/2006

* cited by examiner

*Primary Examiner* — Mahidere Sahle
(74) *Attorney, Agent, or Firm* — Kenyon & Kenyon LLP

(57) ABSTRACT

A microscope objective lens satisfies the following conditional expressions (1) and (2).

$$0.05 < NA < 0.4 \quad (1)$$

$$3 \text{ mm} < D/NA < 50 \text{ mm} \quad (2)$$

where,

NA denotes a numerical aperture on an object side of the microscope objective lens, and D denotes a total thickness of the microscope objective lens.

5 Claims, 23 Drawing Sheets

FIG. 2A
FIG. 2B
FIG. 2C
FIG. 2D
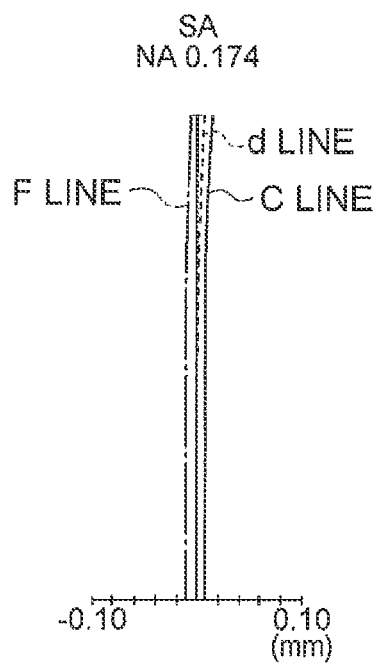
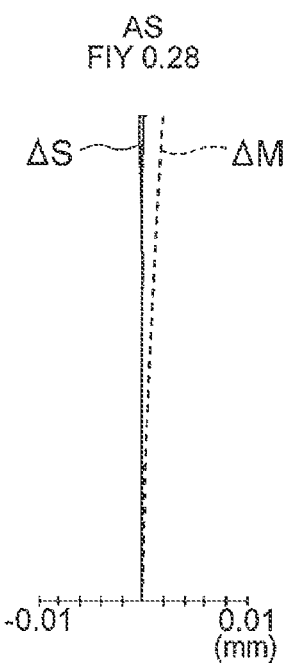
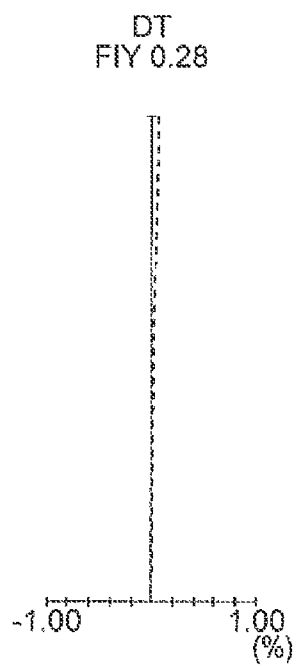
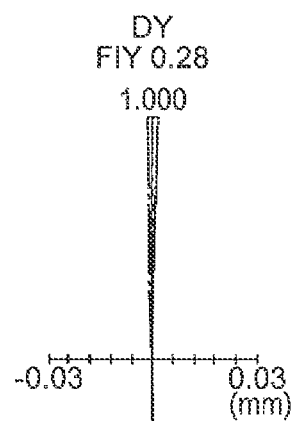

MICROSCOPE OBJECTIVE LENS

CROSS-REFERENCE TO RELATED APPLICATION

The present application is based upon and claims the benefit of priority from the prior Japanese Patent Application Nos. 2012-018988 filed on Jan. 31, 2012 and 2012-271025 filed on Dec. 12, 2012; the entire contents of which are incorporated herein by reference.

BACKGROUND OF THE INVENTION

1. Field of the Invention

The present invention relates to a microscope objective lens.

2. Description of the Related Art

In microscope objective lenses heretofore, higher the magnification of a microscope objective lens, larger is the number of lenses used therein.

For example, in Japanese Patent Application Laid-open Publication No. 2006-65023, a microscope objective lens which includes eight lenses has been disclosed. The above-mentioned microscope objective lens is a microscope objective lens with a magnification of four times, NA (numerical aperture) of 0.16, and a focal length of 45 mm.

SUMMARY OF THE INVENTION

A microscope objective lens according to the present invention satisfies the following conditional expressions (1) and (2).

$$0.05 < NA < 0.4 \quad (1)$$

$$3 \text{ mm} < D/NA < 50 \text{ mm} \quad (2)$$

where,

NA denotes a numerical aperture on an object side of the microscope objective lens, and D denotes a total thickness of the microscope objective lens.

BRIEF DESCRIPTION OF THE DRAWINGS

FIG. 2A, FIG. 2B, FIG. 2C, and FIG. 2D (hereinafter, 'FIG. 2A to FIG. 2D') are aberration diagrams of the microscope objective lens according to the first embodiment;

DETAILED DESCRIPTION OF THE INVENTION

Figure 1:
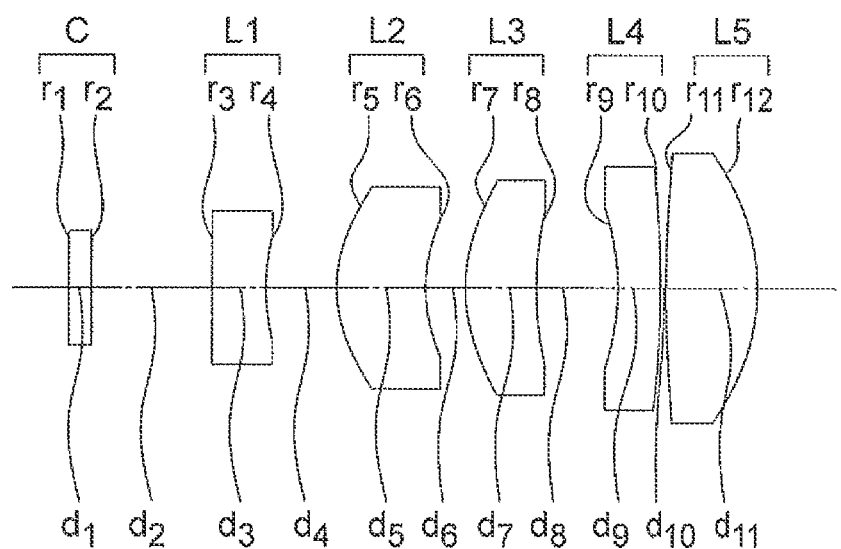
FIG. 1 is a lens cross-sectional view of a microscope objective lens according to a first embodiment of the present invention.

Exemplary embodiments of a microscope objective lens according to the present invention will be described below in detail by referring to the accompanying diagrams. However, the present invention is not restricted to the embodiments described below.

In the following description, an object side means a specimen (sample) side.

The microscope objective lens according to an aspect of the present invention satisfies the following conditional expressions (1) and (2).

$$0.05 < NA < 0.4 \quad (1)$$

$$3 \text{ mm} < D/NA < 50 \text{ mm} \quad (2)$$

where,

NA denotes a numerical aperture on an object side of the microscope objective lens, and D denotes a total thickness of the microscope objective lens.

Conditional expression (2) is a conditional expression which establishes a relationship of (between) the numerical aperture NA on the object side of the microscope objective lens and the total thickness D of the microscope objective lens, and conditional expression (1) is a conditional expression which regulates a range of NA in conditional expression (2).

When a lower limit of conditional expression (2) is surpassed, since NA is excessively high (large) with respect to the total thickness D, an aberration becomes substantial, and a resolution is degraded.

When an upper limit of conditional expression (2) is surpassed, since the total thickness is more (D is large), an amount of light absorbed at the microscope objective lens becomes large, and accordingly, a transmittance is degraded.

It is preferable that the microscope objective lens satisfies the following conditional expression (1') instead of conditional expression (1).

$$0.1<NA<0.3 \quad (1')$$

It is more preferable that the microscope objective lens satisfies the following conditional expression (1") instead of conditional expression (1).

$$0.15<NA<0.25 \quad (1")$$

It is preferable that the microscope objective lens satisfies the following conditional expression (2') instead of conditional expression (2).

$$4\text{ mm}<D/NA<30\text{ mm} \quad (2')$$

It is more preferable that the microscope objective lens satisfies the following conditional expression (2") instead of conditional expression (2).

$$5\text{ mm}<D/NA<22\text{ mm} \quad (2")$$

Moreover, an upper limit value or a lower limit value of conditional expression (1') may be let to be an upper limit value or a lower limit value of conditional expressions (1) and (1"), and an upper limit value or a lower limit value of conditional expression (1") may be let to be an upper limit value or a lower limit value of conditional expressions (1) and (1').

Furthermore, an upper limit value or a lower limit value of conditional expression (2') may be let to be an upper limit value or a lower limit value of conditional expressions (2) and (2"), and an upper limit value or a lower limit value of conditional expression (2") may be let to be an upper limit value or a lower limit value of conditional expressions (2) and (2').

Moreover, it is preferable that the microscope objective lens according to an aspect of the present invention satisfies the following conditional expression (3).

$$0.5<D/AD<7 \quad (3)$$

where,

D denotes the total thickness of the microscope objective lens, and

AD denotes a sum of air spaces between lenses of the microscope objective lens.

Conditional expression (3) is a conditional expression which establishes a relationship of (between) the total thickness D of the microscope objective lens and the sum of air spaces between the lenses of the microscope objective lens.

When a lower limit of conditional expression (3) is surpassed, since the total thickness is small (D is small), achieving both, that is correction of astigmatism and correction of curvature of field is not possible.

When an upper limit of conditional expression (3) is surpassed, since the total thickness is more (D is large), the transmittance is degraded.

It is preferable that the microscope objective lens satisfies the following conditional expression (3') instead of conditional expression (3).

$$1<D/AD<5 \quad (3')$$

It is more preferable that the microscope objective lens satisfies the following conditional expression (3") instead of conditional expression (3).

$$1.5<D/AD<3.5 \quad (3")$$

Moreover, an upper limit value or a lower limit value of conditional expression (3') may be let to be an upper limit value or a lower limit value of conditional expressions (3) and (3"), and an upper limit value or a lower limit value of conditional expression (3") may be let to be an upper limit value or a lower limit value of conditional expressions (3) and (3").

It is preferable that the microscope objective lens according to an aspect of the present invention satisfies the following conditional expression (4).

$$0.2<D/f<2 \quad (4)$$

where,

D denotes the total thickness of the microscope objective lens, and

F denotes a focal length of the overall microscope objective lens system.

Conditional expression (4) is a conditional expression which establishes a relationship of the total thickness D of the microscope objective lens and the focal length f of the overall microscope objective lens system.

When a lower limit of conditional expression (4) is surpassed, since the focal length of the microscope objective lens is long, for high-magnification observation, it is necessary to make long a focal length of a tube lens as well. Therefore, an overall optical system becomes large.

When an upper limit of conditional expression (4) is surpassed, since the total thickness is large (D is large), the amount of light absorbed by the microscope objective lens becomes large, and accordingly, the transmittance is degraded.

It is preferable that the microscope objective lens satisfies the following conditional expression (4') instead of conditional expression (4).

$$0.3<D/f<1.3 \quad (4')$$

It is more preferable that the microscope objective lens satisfies the following conditional expression (4") instead of conditional expression (4).

$$0.4<D/f<1 \quad (4")$$

Moreover, an upper limit value or a lower limit value of conditional expression (4') may be let to an upper limit value or a lower limit value of conditional expressions (4) and (4"), and an upper limit value or a lower limit value of conditional expression (4") may be let to be an upper limit value or a lower limit value of conditional expressions (4) and (4').

In the microscope objective lens according to an aspect of the present invention, it is preferable that a lens which forms the microscope objective lens is made of at least two types of glass, and that a refractive index of the lens for a d-line is not more than 1.7.

Accordingly, correction of a chromatic aberration becomes possible.

Moreover, when the refractive index becomes 1.7 or higher than 1.7, a difference in a refractive index of a lens surface and a refractive index of an air surface becomes large, and a reflectivity of a lens surface becomes high. Therefore, the transmittance is degraded.

Moreover, in the microscope objective lens according to an aspect of the present invention, it is preferable that the microscope objective lens is accommodated in a microscope objective lens unit, and that the microscope objective lens unit has a detaching portion which is detachable from an observation apparatus.

A range of observation of a microscope is (given by a formula) field number/(focal length of tube lens/focal length of microscope objective lens), and by having the detaching portion, it is possible to detach from microscopes of various types.

Moreover, in the microscope objective lens according to an aspect of the present invention, it is preferable to calculate a parfocalizing distance PD of the microscope objective lens by the following expression (5).

$$PD=45+15m \quad (5)$$

where, m is −1, 0, 1, 2, 3, or 4.

The parfocalizing distance PD is a parfocalizing distance in a case of no cover glass, and a parfocalizing distance in a case of having a cover glass is given by adding t (n−1/n) to the parfocalizing distance PD in the case of no cover glass. Here, t denotes a thickness of the cover glass, and n denotes a refractive index of the cover glass.

Since the parfocalizing distance calculated by the above-mentioned expression (5) is same as a parfocalizing distance of the existing microscope objective lens, even when the microscope objective lens according to the present invention is selected, it is possible to focus at a specimen all the time.

Exemplary embodiments of the microscope objective lens according to the present invention will be described below in detail by referring to the accompanying diagrams. However, the present invention is not restricted to the embodiments described below.

Figure 21:
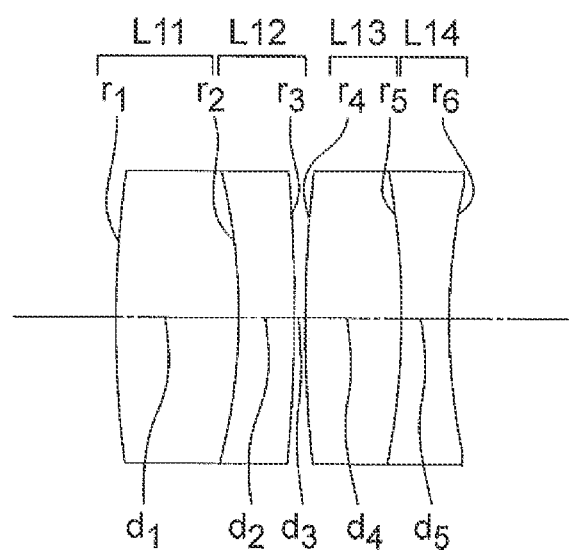
FIG. 21 is a cross-sectional view of a tube lens.
Figure 22:
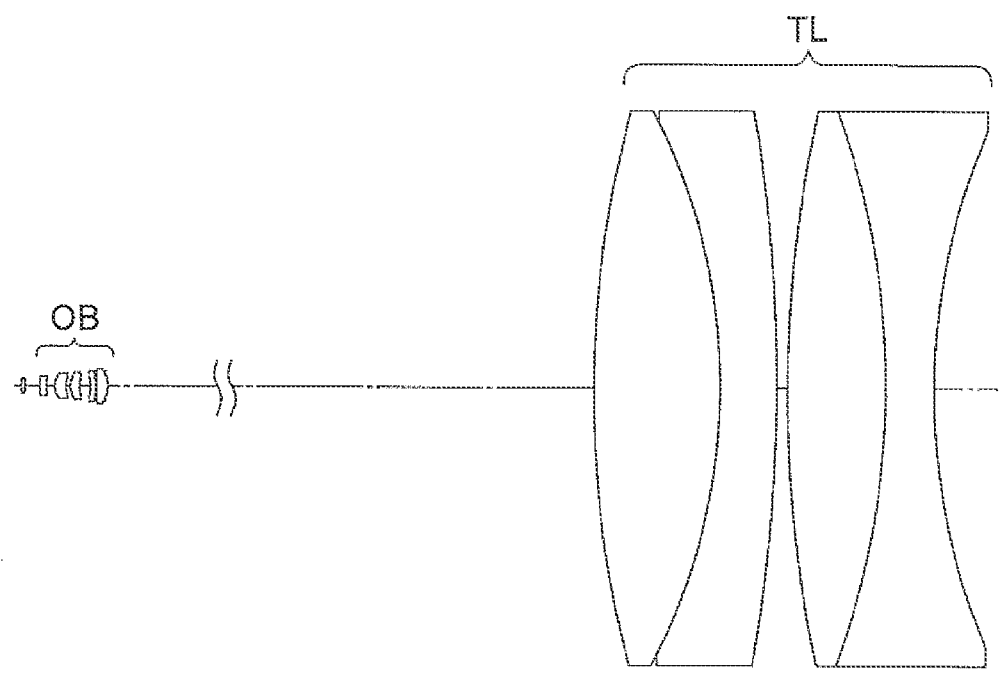
FIG. 22 is a lens cross-sectional view when the tube lens and the microscope objective lens according to the first embodiment are combined.

A first embodiment, a second embodiment, a third embodiment, a fourth embodiment, a fifth embodiment, a sixth embodiment, a seventh embodiment, an eighth embodiment, a ninth embodiment, and a tenth embodiment (hereinafter, 'embodiments from the first embodiment to the tenth embodiment') of the microscope objective lens according to the present invention will be described below. Lens cross-sectional views of microscope objective lenses according to the embodiments from the first embodiment to the tenth embodiment are shown in FIG. 1, FIG. 3, FIG. 5, FIG. 7, FIG. 9, FIG. 11, FIG. 13, FIG. 15, FIG. 17, and FIG. 19 respectively. In these lens cross-sectional views, L1, L2, L3, L4, L5, L6, and L7 denote lenses, and C denotes a cover glass. Moreover, FIG. 21 is a cross-sectional view of a tube lens, and FIG. 22 is a lens cross-sectional view when the tube lens and the microscope objective lens according to the present invention are combined. In FIG. 22, OB denotes an objective lens, and TL denotes the tube lens.

The microscope objective lenses according to the embodiments from the first embodiment to the tenth embodiment are infinity-corrected microscope objective lenses. In the infinity-corrected microscope objective lenses, since a light beam which is emerged from the microscope objective lens becomes parallel, image is not formed by the microscope objective lens. Therefore, a parallel light beam is converged by the tube lens as shown in FIG. 21 for instance, and an image of a specimen surface is formed at a position where the parallel beam is converged.

A microscope objective lens according to the first embodiment, as shown in FIG. 1, includes in order from an object side, a biconcave negative lens L1, a positive meniscus lens L2 having a convex surface directed toward the object side, a positive meniscus lens L3 having a convex surface directed toward the object side, a negative meniscus lens L4 having a convex surface directed toward an image side, and a biconvex positive lens L5.

In each embodiment, a first surface r1 is a specimen surface.

An aspheric surface is used for a total of 10 surfaces namely, both surfaces of the biconcave negative lens L1, both surfaces of the positive meniscus lens L2, both surfaces of the positive meniscus lens L3, both surfaces of the negative meniscus lens L4, and both surfaces of the biconvex positive lens L5.

Figure 3:
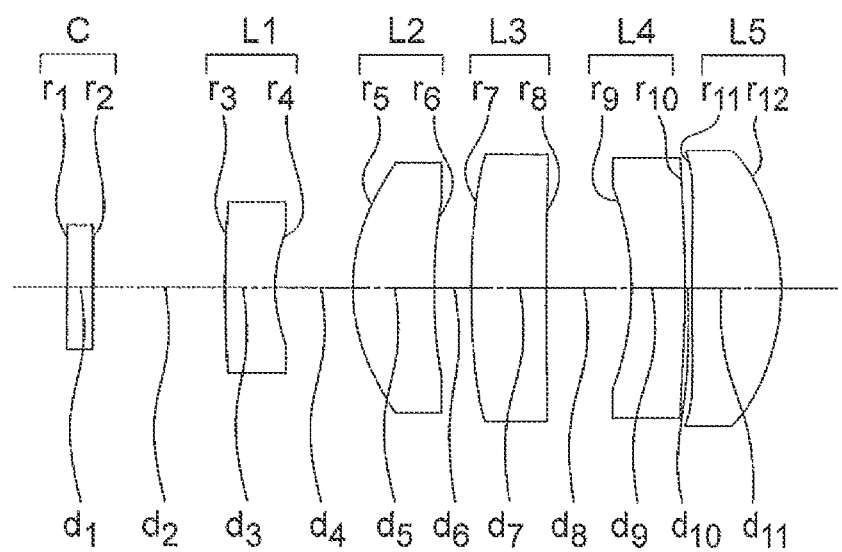
FIG. 3 is a lens cross-sectional view of a microscope objective lens according to a second embodiment of the present invention.

A microscope objective lens according to the second embodiment, as shown in FIG. 3, includes a negative meniscus lens L1 having a convex surface directed toward an object side, a positive meniscus lens L2 having a convex surface directed toward the object side, a positive meniscus lens L3 having a convex surface directed toward the object side, a negative meniscus lens L4 having a convex surface directed toward an image side, and a biconvex positive lens L5.

An aspheric surface is used for a total of 10 surfaces namely, both surfaces of the negative meniscus lens L1, both surfaces of the positive meniscus lens L2, both surfaces of the positive meniscus lens L3, both surfaces of the negative meniscus lens L4, and both surfaces of the biconvex positive lens L5.

Figure 5:
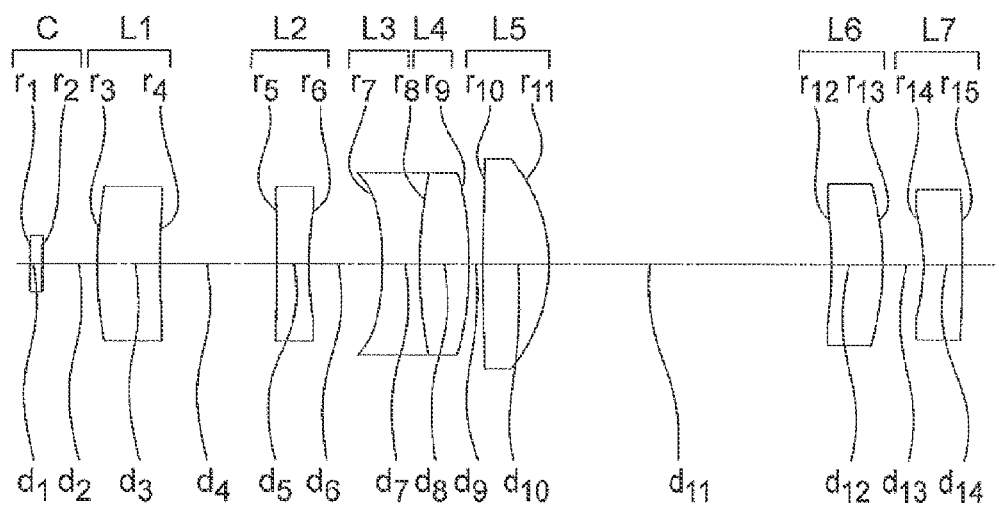
FIG. 5 is a lens cross-sectional view of a microscope objective lens according to a third embodiment of the present invention.

A microscope objective lens according to the third embodiment, as shown in FIG. 5, includes a positive meniscus lens L1 having a convex surface directed toward an object side, a biconcave negative lens L2, a cemented lens of a biconcave negative lens L3 and a biconvex positive lens L4, a biconvex positive lens L5, a positive meniscus lens L6 having a convex surface directed toward an image side, and a negative meniscus lens L7 having a convex surface directed toward the image side.

An aspheric surface is used for a total of 12 surfaces namely, both surfaces of the positive meniscus lens L1, both surfaces of the biconcave negative lens L2, a surface on the object side of the biconcave negative lens L3, a surface on the image side of the biconvex positive lens L4, both surfaces of the biconvex positive lens L5, both surfaces of the positive meniscus lens L6, and both surfaces of the negative meniscus lens L7.

Figure 7:
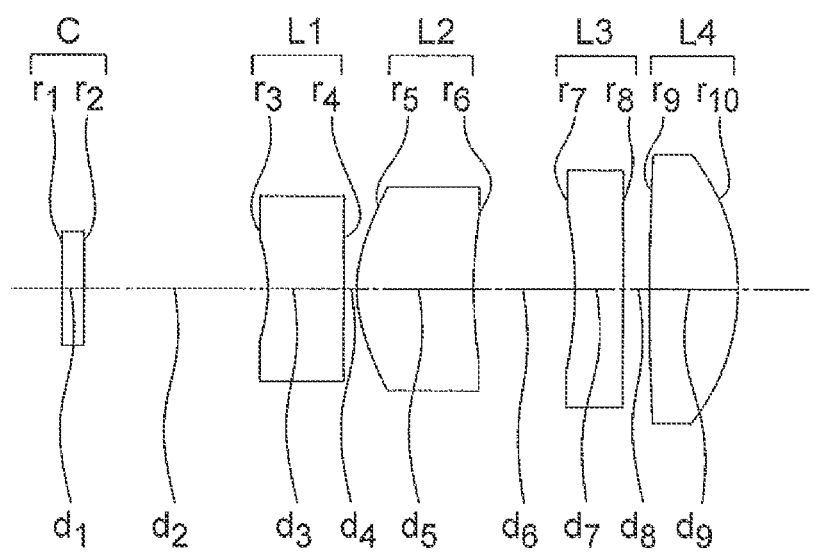
FIG. 7 is a lens cross-sectional view of a microscope objective lens according to a fourth embodiment of the present invention.
Figure 8A:
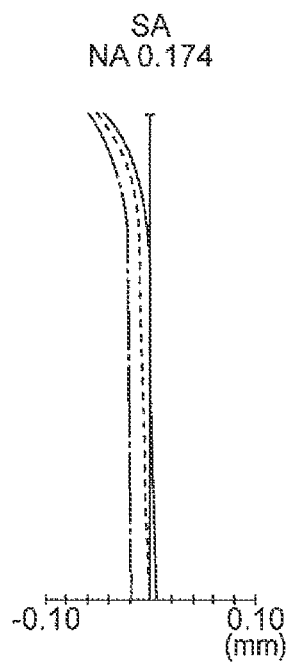
FIG. 8A, FIG. 8B, FIG. 8C, and FIG. 8D (hereinafter, 'FIG. 8A to FIG. 8D') are aberration diagrams of the microscope objective lens according to the fourth embodiment.
Figure 8B:
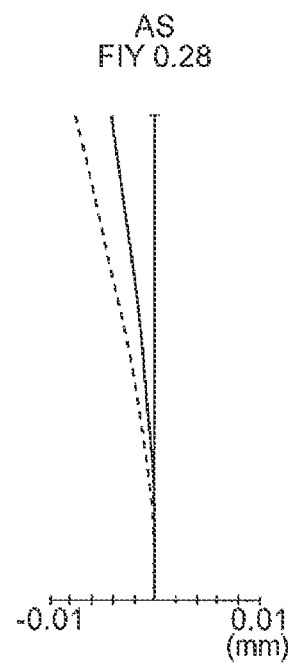
Figure 8C:
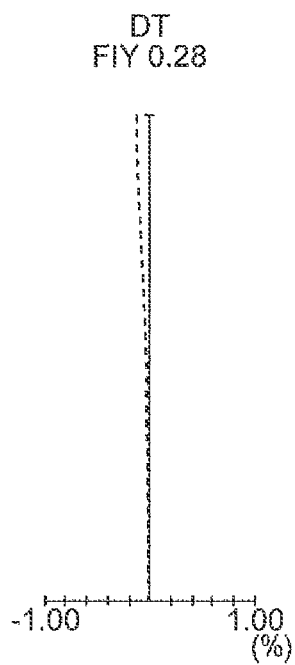
Figure 8D:
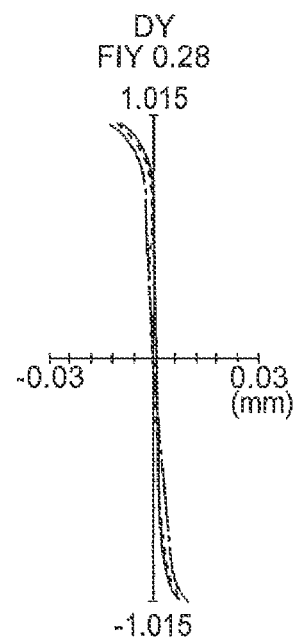

A microscope objective lens according to the fourth embodiment, as shown in FIG. 7, includes a negative meniscus lens L1 having a convex surface directed toward an image side, a positive meniscus lens L2 having a convex surface directed toward an object side, a negative meniscus lens L3 having a convex surface directed toward the image side, and a biconvex positive lens L4.

An aspheric surface is used for a total of six surfaces namely, both surfaces of the negative meniscus lens L1, both surfaces of the positive meniscus lens L2, and both surfaces of the negative meniscus lens L3.

Figure 9:
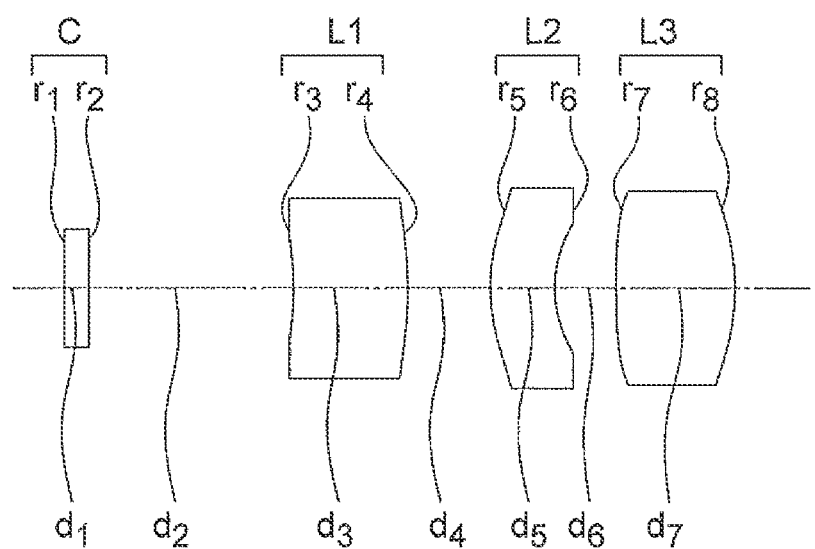
FIG. 9 is a lens cross-sectional view of a microscope objective lens according to a fifth embodiment of the present invention.
Figure 10A:
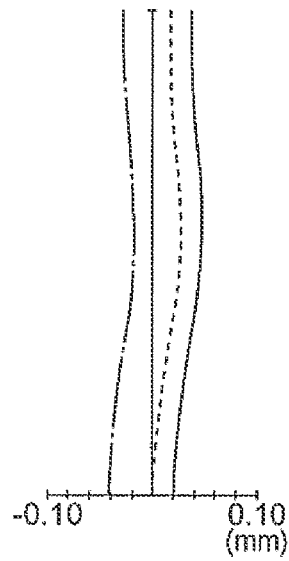
FIG. 10A, FIG. 10B, FIG. 10C, and FIG. 10D (hereinafter, 'FIG. 10A to FIG. 10D') are aberration diagrams of the microscope objective lens according to the fifth embodiment.
Figure 10B:
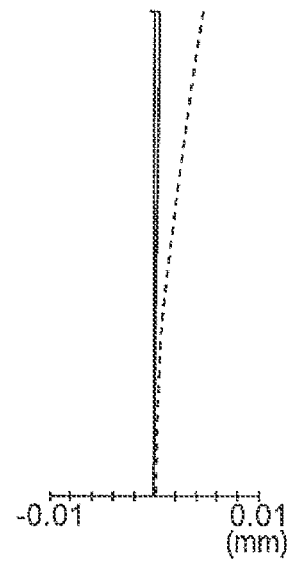
Figure 10C:
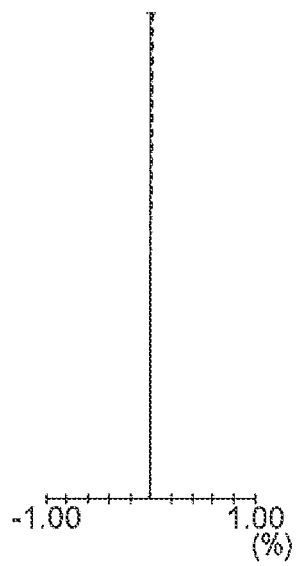
Figure 10D:
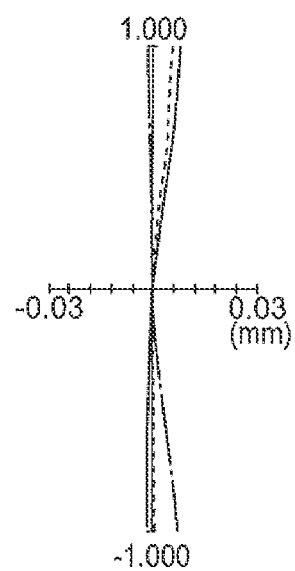

A microscope objective lens according to the fifth embodiment, as shown in FIG. 9, includes a negative meniscus lens L1 having a convex surface directed toward an image side, a negative meniscus lens L2 having a convex surface directed toward an object side, and a biconvex positive lens L3.

An aspheric surface is used for a total of six surfaces namely, both surfaces of the negative meniscus lens L1, both surfaces of the negative meniscus lens L2, and both surfaces of the biconvex positive lens L3.

Figure 11:
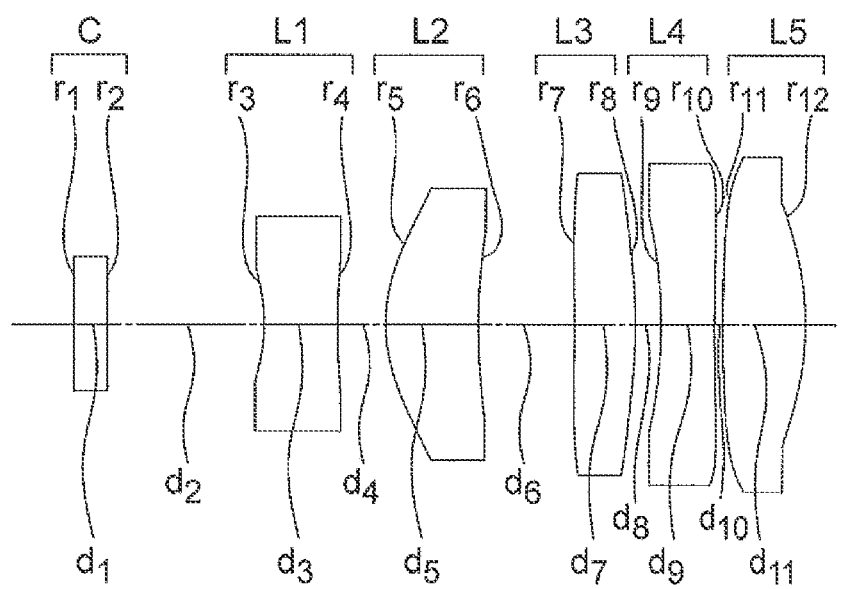
FIG. 11 is a lens cross-sectional view of a microscope objective lens according to a sixth embodiment of the present invention.
Figure 12A:
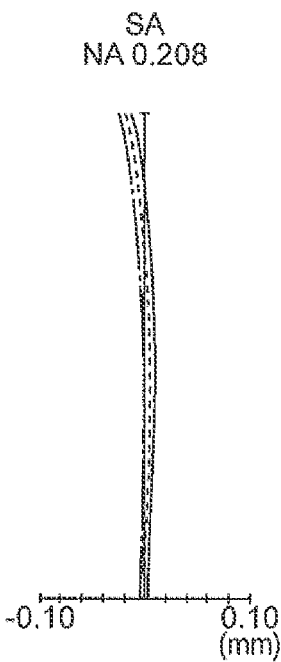
FIG. 12A, FIG. 12B, FIG. 12C, and FIG. 12D (hereinafter, 'FIG. 12A to FIG. 12D') are aberration diagrams of the microscope objective lens according to the sixth embodiment.
Figure 12B:
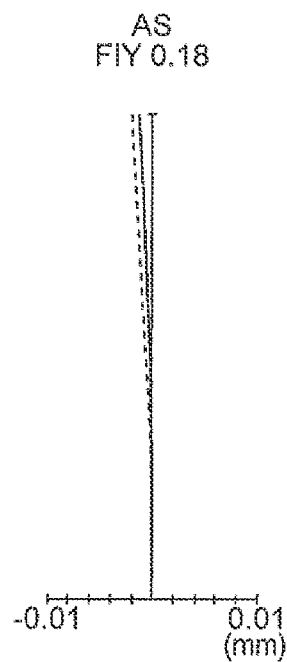
Figure 12C:
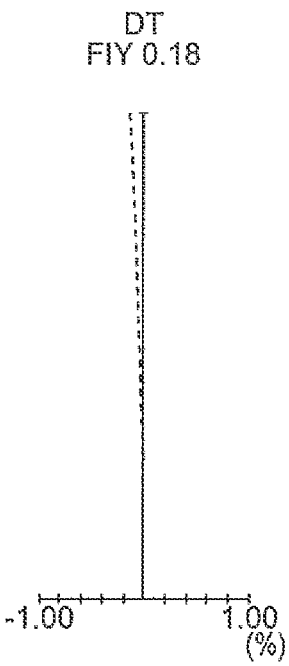
Figure 12D:
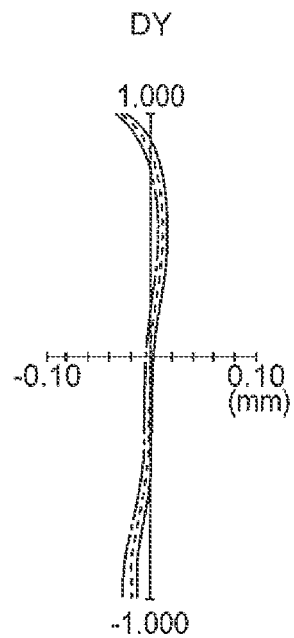

A microscope objective lens according to the sixth embodiment, as shown in FIG. 11, includes a biconcave negative lens L1, a positive meniscus lens L2 having a convex surface directed toward an object side, a positive meniscus lens L3 having a convex surface directed toward an image side, a biconcave negative lens L4, and a biconvex positive lens L5.

An aspheric surface is used for a total of 10 surfaces namely, both surface of the biconcave negative lens L1, both surfaces of the positive meniscus lens L2, both surfaces of the positive meniscus lens L3, both surfaces of the biconcave negative lens L4, and both surfaces of the biconvex positive lens L5.

Figure 13:
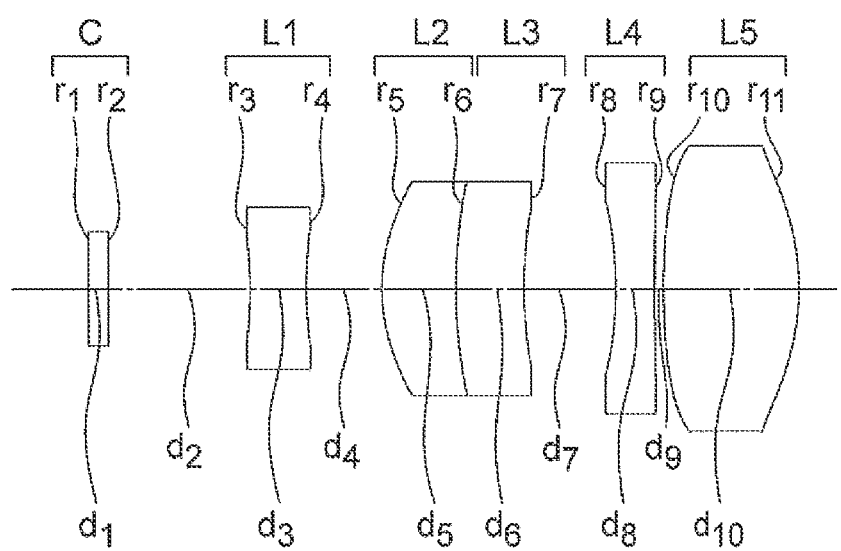
FIG. 13 is a lens cross-sectional view of a microscope objective lens according to a seventh embodiment of the present invention.
Figure 14A:
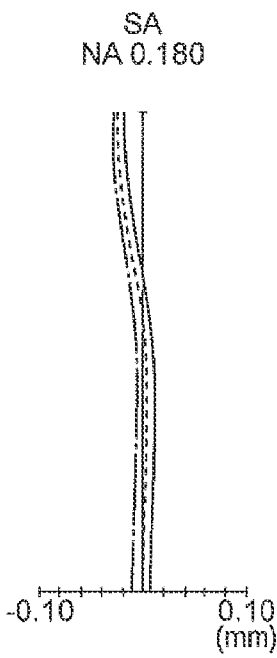
FIG. 14A, FIG. 14B, FIG. 14C, and FIG. 14D (hereinafter, 'FIG. 14A to FIG. 14D') are aberration diagrams of the microscope objective lens according to the seventh embodiment.
Figure 14B:
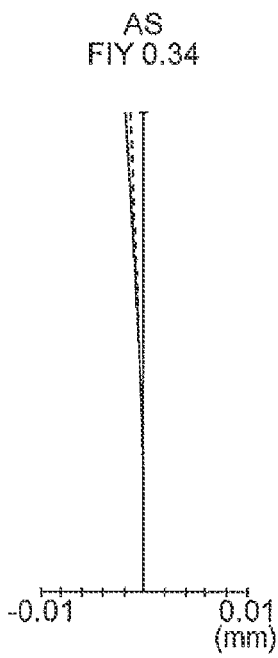
Figure 14C:
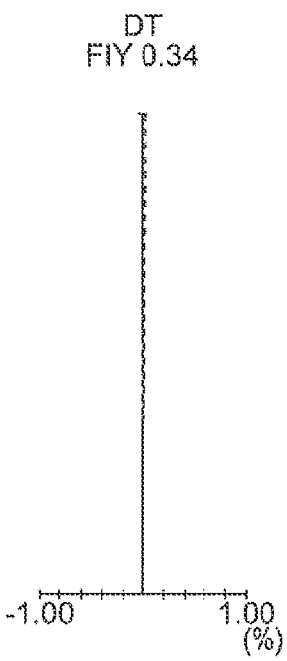
Figure 14D:
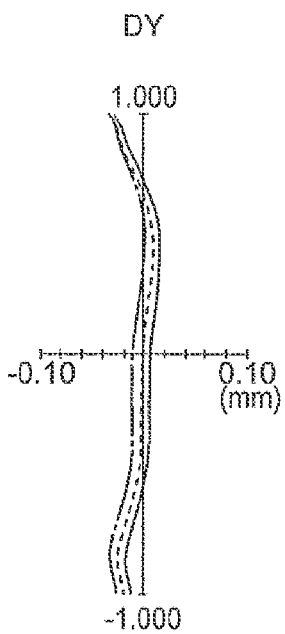

A microscope objective lens according to the seventh embodiment, as shown in FIG. 13, includes a biconcave negative lens L1, a cemented lens of a positive meniscus lens L2 having a convex surface directed toward an object side and a negative meniscus lens L3 having a convex surface directed toward the object side, a biconcave negative lens L4, and a biconvex positive lens L5.

An aspheric surface is used for a total of nine surfaces namely, both surfaces of the biconcave negative lens L1, a surface on the object side of the positive meniscus lens L2, a cemented surface of the positive meniscus lens L2 and the negative meniscus lens L3, a surface on an image side of the negative meniscus lens L3, both surfaces of the biconcave negative lens L4, and both surfaces of the biconvex positive lens L5.

Figure 15:
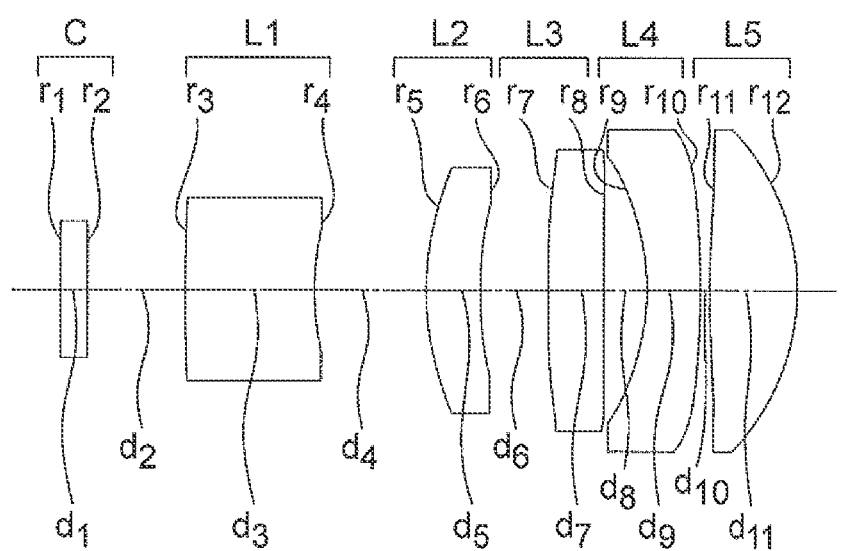
FIG. 15 is a lens cross-sectional view of a microscope objective lens according to an eighth embodiment of the present invention.
Figure 16A:
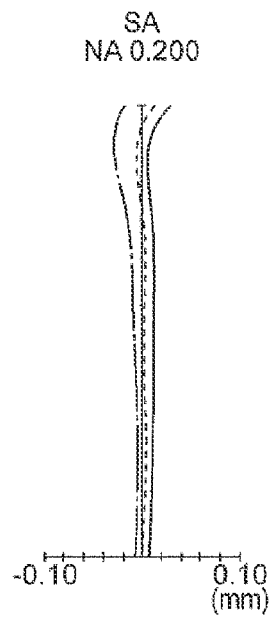
FIG. 16A, FIG. 16B, FIG. 16C, and FIG. 16D (hereinafter, 'FIG. 16A to FIG. 16D') are aberration diagrams of the microscope objective lens according to the eighth embodiment.
Figure 16B:
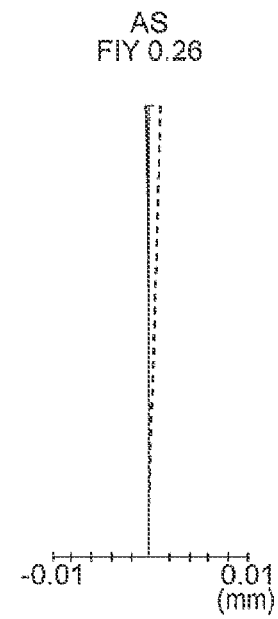
Figure 16C:
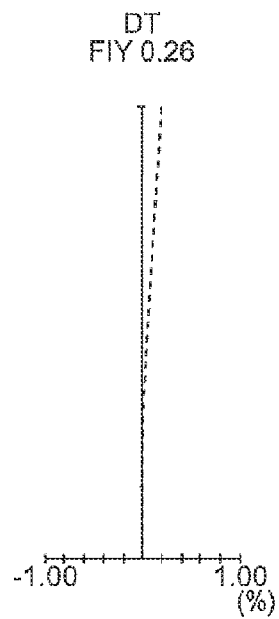
Figure 16D:
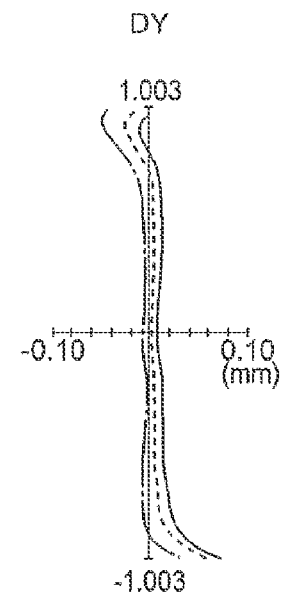

A microscope objective lens according to the eighth embodiment, as shown in FIG. 15, includes a negative meniscus lens L1 having a convex surface directed toward an object side, a positive meniscus lens L2 having a convex surface directed toward the object side, a biconvex positive lens L3, a negative meniscus lens L4 having a convex surface directed toward an image side, and a biconvex positive lens L5.

An aspheric surface is used for a total of 10 surfaces namely, both surfaces of the negative meniscus lens L1, both surfaces of the positive meniscus lens L2, both surfaces of the biconvex positive lens L3, both surfaces of the negative meniscus lens L4, and both surfaces of the biconvex positive lens L5.

Figure 17:
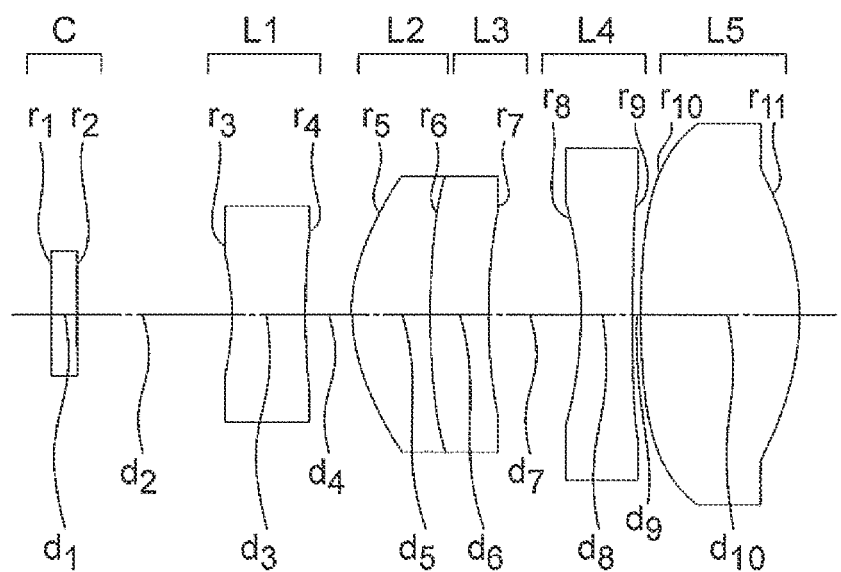
FIG. 17 is a lens cross-sectional view of a microscope objective lens according to a ninth embodiment of the present invention.
Figure 18A:
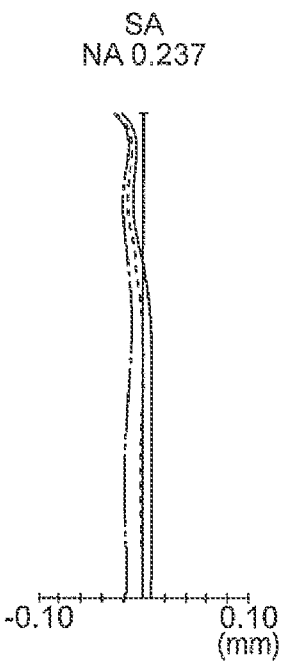
FIG. 18A, FIG. 18B, FIG. 18C, and FIG. 18D (hereinafter, 'FIG. 18A to FIG. 18D') are aberration diagrams of the microscope objective lens according to the ninth embodiment.
Figure 18B:
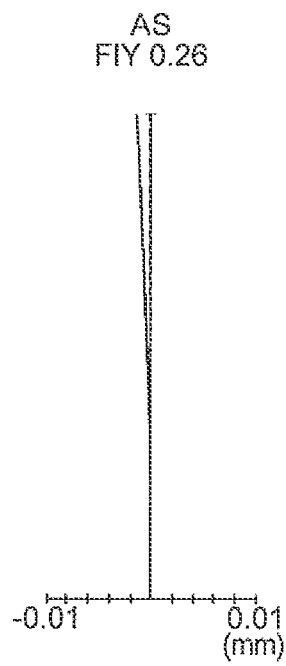
Figure 18C:
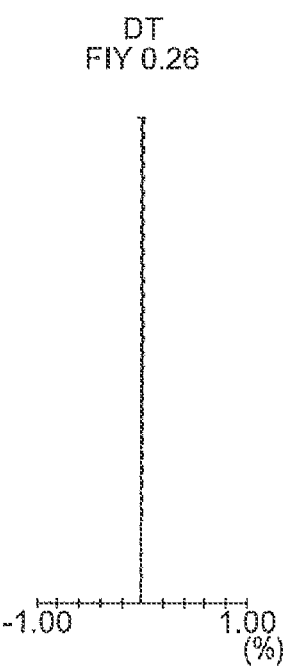
Figure 18D:
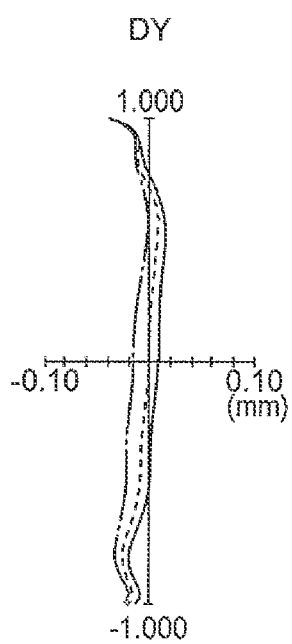

A microscope objective lens according to the ninth embodiment, as shown in FIG. 17, includes a biconcave negative lens L1, a cemented lens of a positive meniscus lens L2 having a convex surface directed toward an object side and a negative meniscus lens L3 having a convex surface directed toward the object side, a biconcave negative lens L4, and a biconvex positive lens L5.

An aspheric surface is used for a total of nine surfaces namely, both surfaces of the biconcave negative lens L1, a surface on the object side of the positive meniscus lens L2, a cemented surface of the positive meniscus lens L2 and the negative meniscus lens L3, a surface on an image side of the negative meniscus lens L3, both surfaces of the biconcave negative lens L4, and both surfaces of the biconvex positive lens L5.

Figure 19:
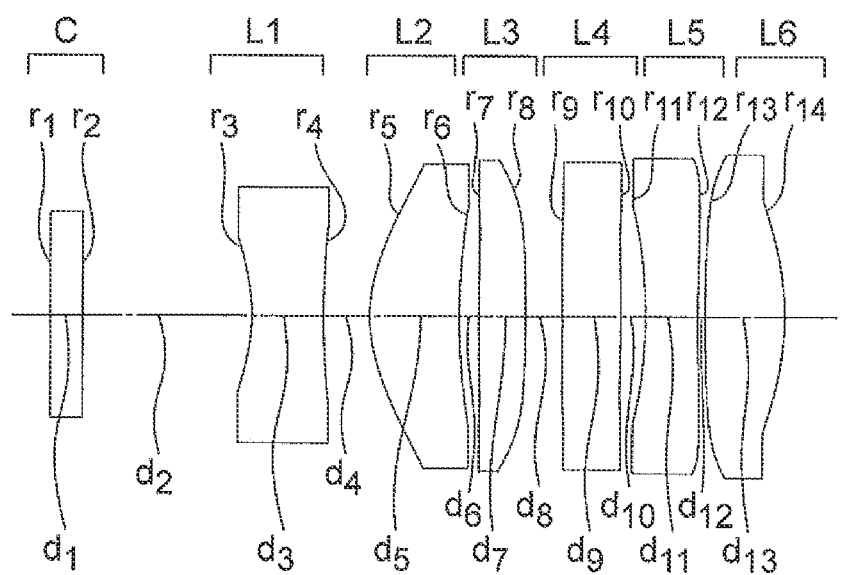
FIG. 19 is a lens cross-sectional view of a microscope objective lens according to a tenth embodiment of the present invention.

A microscope objective lens according to the tenth embodiment, as shown in FIG. 19, includes, a biconcave negative lens L1, a positive meniscus lens L2 having a convex surface directed toward an object side, a biconvex positive lens L3, a positive meniscus lens L4 having a convex surface directed toward an image side, a biconcave negative lens L5, and a biconvex positive lens L6.

An aspheric surface is used for a total of 12 surfaces namely, both surfaces of the biconcave negative lens L1, both surfaces of the positive meniscus lens L2, both surfaces of the biconvex positive lens L3, both surfaces of the positive meniscus lens L4, both surfaces of the biconcave negative lens L5, and both surfaces of the biconvex positive lens L6.

The tube lens, as shown in FIG. 21, includes a biconvex lens L11, a negative meniscus lens L12 having a convex surface directed toward an image side, a biconvex lens L13, and a biconcave negative lens L14. The biconvex lens L11 and the negative meniscus lens L12 are cemented. Moreover, the biconvex lens L13 and the biconcave negative lens L14 are cemented.

Numerical data of each embodiment described above is shown below. Apart from symbols described above, r denotes radius of curvature of each lens surface, d denotes a distance between two lenses, nd denotes a refractive index of each lens for a d-line, νd1 denotes an Abbe constant for each lens. f denotes a focal length of the entire zoom lens system, NA denotes a numerical aperture of lens of object-side, $F_{NO}$ denotes an F number, ω denotes a half angle of field, WD denotes a working distance. Further, * denotes an aspheric data.

When x is let to be an optical axis with a direction of traveling of light as a positive (direction), and y is let to be in a direction orthogonal to the optical axis, a shape of the aspheric surface is described by the following expression.

$$x=(y^2/R)/[1+\{1-(K+1)(y/R)^2\}^{1/2}]+A_4 y^4+A_6 y^6+A_8 y^8+A_{10} y^{10}+A_{12} y^{12}$$

where, R denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

Hereinafter "ob" denotes object plane.

Example 1

| Unit mm | | | | |
|---|---|---|---|---|
| Surface data | | | | |
| Surface no. | r | d | nd | vd |
| 1 (ob) | ∞ | 0.17 | 1.5163 | 64.1 |
| 2 | ∞ | 0.93 | | |
| 3* | −39.28 | 0.41 | 1.5307 | 55.7 |
| 4* | 1.58 | 0.55 | | |
| 5* | 1.08 | 0.69 | 1.5307 | 55.7 |
| 6* | 1.16 | 0.31 | | |
| 7* | 1.27 | 0.55 | 1.5307 | 55.7 |
| 8* | 2.82 | 0.63 | | |
| 9* | −2.01 | 0.33 | 1.6349 | 23.9 |
| 10* | −7.77 | 0.04 | | |
| 11* | 8.27 | 0.70 | 1.5307 | 55.7 |
| 12* | −1.74 | | | |

Aspherical surface data

3rd surface k = 1.5000e+001
a = 1.5292e−002, b = −2.6082e−003, c = 6.9681e−004,
d = −3.0641e−005
4th surface k = −8.1764e−001
a = −7.7369e−002, b = 1.0338e−002, c = 1.0829e−004,
d = −9.8389e−005
5th surface k = −1.2590e+000
a = −1.7655e−002, b = −2.5790e−003

-continued

Unit mm

6th surface k = −8.6895e−001
a = −1.0585e−001, b = 1.7929e−002, c = 1.6927e−003
7th surface k = −1.5753e+000
a = −4.1155e−002, b = 1.4678e−002
8th surface k = 1.3514e+000
a = 1.7655e−002, b = −3.3527e−003
9th surface k = 1.5046e+000
a = 5.3763e−002, b = −2.9705e−002, c = −6.9808e−004
10th surface k = 3.5929e+000
a = 3.4244e−002, b = −3.2268e−002, c = −2.1329e−003
11th surface k = −5.0000e+000
a = −1.3838e−002, b = −5.7848e−004, c = 4.1265e−004
12th surface k = −1.1539e+000
a = −2.5780e−002, b = −2.2360e−003, c = 3.7672e−003

| Focal length | 4.5 |
|---|---|
| NA | 0.17 |
| WD | 0.93 |
| Maximum image height | 0.28 |

Example 2

Unit mm

Surface data

| Surface no. | r | d | nd | vd |
|---|---|---|---|---|
| 1 (ob) | ∞ | 0.17 | 1.5163 | 64.1 |
| 2 | ∞ | 1.10 | | |
| 3* | 9.58 | 0.37 | 1.5337 | 55.9 |
| 4* | 1.20 | 0.63 | | |
| 5* | 1.43 | 0.66 | 1.5446 | 56.0 |
| 6* | 4.75 | 0.31 | | |
| 7* | 6.27 | 0.61 | 1.5446 | 56.0 |
| 8* | 55.42 | 0.69 | | |
| 9* | −2.22 | 0.43 | 1.6142 | 25.6 |
| 10* | −10.83 | 0.06 | | |
| 11* | 15.52 | 0.72 | 1.5337 | 55.9 |
| 12* | −1.93 | | | |

Aspherical surface data

3rd surface k = −2.2071e+002
a = 1.3211e−002, b = −8.2349e−004, c = 2.0830e−004, d = −4.7133e−006, e = −1.0299e−006, f = 8.7247e−008, g = −9.5085e−010
4th surface k = −1.6336e+000
a = −2.8064e−002, b = 2.8170e−003, c = −2.0563e−004, d = −1.9198e−005, e = 2.9801e−006, f = −4.5050e−008, g = 1.3259e−008
5th surface k = −5.7921e−001
a = −1.0702e−002, b = −2.5916e−002, c = 4.2975e−003, d = −3.7653e−004, e = −1.4533e−005, f = −1.4245e−006, g = 7.7289e−007

-continued

Unit mm

6th surface k = 2.4836e−001
a = 3.2573e−002, b = −3.3138e−002, c = 2.5668e−002, d = −5.7221e−003, e = 3.0196e−004, f = −1.5543e−005, g = −1.2315e−005
7th surface k = −3.9383e+000
a = −6.7509e−003, b = 2.0564e−002, c = 3.5887e−003, d = −3.0518e−003, e = −4.9395e−005, f = −9.4424e−006, g = 1.4299e−006
8th surface k = −3.8964e+002
a = 1.0676e−002, b = 1.1249e−002, c = −9.4845e−003, d = 1.2875e−003, e = −6.1447e−005, f = −5.6834e−005, g = 1.0704e−004
9th surface k = 1.4272e+000
a = 4.1289e−002, b = −1.6301e−002, c = 1.4390e−002, d = −6.2550e−004, e = 1.3290e−003, f = 4.5438e−004, g = −1.6981e−003
10th surface k = −1.5658e+002
a = −1.4678e−002, b = 3.2408e−002, c = −2.5992e−002, d = 5.0919e−003, e = 2.6945e−003, f = 4.2757e−003, g = −2.9207e−003
11th surface k = −3.8871e+002
a = −3.3433e−002, b = 1.6018e−002, c = −1.8520e−002, d = −1.1819e−003, e = −3.7513e−003, f = −4.9674e−003, g = 3.2479e−003
12th surface k = 2.6646e−001
a = −4.1496e−003, b = 3.6642e−003, c = −9.0048e−003, d = −9.5081e−005, e = 5.1015e−004, f = 4.2305e−004, g = −1.9400e−003

| Focal length | 5.0 |
|---|---|
| NA | 0.21 |
| WD | 1.10 |
| Maximum image height | 0.30 |

Example 3

Unit mm

Surface data

| Surface no. | r | d | nd | vd |
|---|---|---|---|---|
| 1 (ob) | ∞ | 0.17 | 1.5163 | 64.1 |
| 2 | ∞ | 0.70 | | |
| 3* | 4.72 | 0.82 | 1.8211 | 24.1 |
| 4* | 13.45 | 1.50 | | |
| 5* | −50.02 | 0.42 | 1.7738 | 47.2 |
| 6* | 4.61 | 0.96 | | |
| 7* | −4.75 | 0.49 | 1.8211 | 24.1 |
| 8 | 6.10 | 0.64 | 1.8514 | 40.1 |
| 9* | −5.58 | 0.19 | | |
| 10* | 41.52 | 0.86 | 1.5920 | 67.0 |
| 11* | −2.03 | 3.67 | | |
| 12* | −5.26 | 0.67 | 2.1022 | 16.8 |
| 13* | −3.32 | 0.53 | | |
| 14* | −2.44 | 0.51 | 1.9027 | 31.0 |
| 15* | −27.74 | | | |

Aspherical surface data

3rd surface k = −2.7220e+000
a = −1.4425e−002, b = 3.8809e−003, c = −2.9335e−004

-continued

Unit mm

4th surface k = −1.3940e+000
a = −6.1447e−003, b = 1.6318e−003, c = −1.5337e−004
5th surface k = −4.0363e+004
a = −2.8314e−002, b = 1.7695e−002, c = −1.5017e−003
6th surface k = −3.1120e+000
a = −4.0760e−003, b = 8.6040e−003, c = 6.9363e−003
7th surface k = −3.2788e+001
a = −8.5977e−002, b = 6.6520e−003, c = −1.5895e−002
9th surface k = 4.8450e+000
a = 1.1716e−003, b = −1.2806e−002, c = 4.5774e−003
10th surface k = −7.9163e+002
a = 1.3920e−002, b = −1.2687e−002, c = 3.0654e−003
11th surface k = −9.8900e−001
a = −3.0943e−003, b = −1.0238e−003, c = −5.9130e−004
12th surface k = −2.1342e+001
a = 5.9690e−003, b = −9.0805e−004, c = −9.3268e−005
13th surface k = −6.6050e+000
a = 4.5399e−003, b = −2.7820e−003, c = 1.4599e−004
14th surface k = 8.6000e−002
a = 8.1220e−003, b = −4.8231e−003, c = 1.1973e−003
15th surface k = −2.2449e+002
a = −7.5280e−003, b = 1.7458e−003, c = −9.3967e−005

| Focal length | 3.5 |
| NA | 0.16 |
| WD | 0.7 |
| Maximum image height | 0.21 |

Example 4

Unit mm

Surface data

| Surface no. | r | d | nd | vd |
| --- | --- | --- | --- | --- |
| 1(ob) | ∞ | 0.17 | 1.5163 | 64.1 |
| 2 | ∞ | 1.41 | | |
| 3* | −1.09 | 0.59 | 1.5247 | 56.4 |
| 4* | −15.96 | 0.10 | | |
| 5* | 1.04 | 0.91 | 1.5247 | 56.4 |
| 6* | 3.91 | 0.78 | | |
| 7* | −3.17 | 0.37 | 1.6070 | 27.6 |
| 8* | −26.96 | 0.20 | | |
| 9 | 20.00 | 0.69 | 1.4845 | 70.2 |
| 10 | −1.70 | | | |

-continued

Unit mm

Aspherical surface data

3rd surface k = −6.9786e+000
a = 6.3761e−002, b = −1.8935e−002, c = 5.0398e−003,
d = −7.1260e−004, e = 4.5015e−005
4th surface k = 3.1388e+001
a = 7.7831e−002, b = −1.9566e−002, c = 8.0390e−004,
d = 3.7556e−004, e = −4.4489e−005
5th surface k = −4.3135e+000
a = 5.7351e−002, b = −3.6453e−002, c = 1.7406e−002,
d = −7.9964e−003, e = 1.1960e−003
6th surface k = −1.8788e+001
a = 1.9904e−002, b = 1.9157e−002, c = −1.0712e−002,
d = 6.1387e−003
7th surface k = −3.1804e+000
a = −1.0317e−002, b = 8.5494e−003, c = −1.5358e−002,
d = −1.1944e−003, e = −4.1261e−003
8th surface k = 0.0000e+000
a = 2.6155e−002, b = 2.1272e−002, c = −3.8343e−002

| Focal length | 4.5 |
| NA | 0.17 |
| WD | 1.41 |
| Maximum image height | 0.28 |

Example 5

Unit mm

Surface data

| Surface no. | r | d | nd | vd |
| --- | --- | --- | --- | --- |
| 1(ob) | ∞ | 0.17 | 1.5163 | 64.1 |
| 2 | ∞ | 1.39 | | |
| 3* | −1.95 | 0.78 | 1.5300 | 56.2 |
| 4* | −2.35 | 0.56 | | |
| 5* | 1.31 | 0.44 | 1.5750 | 39.0 |
| 6* | 0.81 | 0.42 | | |
| 7* | 6.59 | 0.81 | 1.5300 | 56.2 |
| 8* | −1.61 | | | |

Aspherical surface data

3rd surface k = −1.0449e+001
a = 5.5882e−002, b = −1.3350e−002, c = 2.6973e−003,
d = −1.0012e−004
4th surface k = −1.6403e+001
a = 6.9137e−002, b = −3.4070e−002, c = 1.1627e−002,
d = −1.5912e−003
5th surface k = −9.3960e−001
a = −3.6455e−002, b = −3.0444e−001, c = 3.8188e−003,
d = 6.7536e−002

-continued

| Unit mm |
|---|

6th surface k = −9.7480e−001
a = 9.8250e−002, b = −3.8374e−001, c = 3.9960e−001,
d = −1.0609e−001

7th surface k = −1.0445e+000
a = 1.8012e−001, b = 1.3582e−001, c = 8.8920e−002,
d = −1.5580e−002

8th surface k = 2.8889e−001
a = 5.2987e−002, b = −3.7558e−002, c = 2.3123e−001,
d = 5.2485e−003

| | |
|---|---|
| Focal length | 4 |
| NA | 0.14 |
| WD | 1.39 |
| Maximum image height | 0.24 |

Example 6

| Unit mm | | | | |
|---|---|---|---|---|
| Surface data | | | | |
| Surface no. | r | d | nd | vd |
| 1(ob) | ∞ | 0.17 | 1.5163 | 64.1 |
| 2 | ∞ | 0.79 | | |
| 3* | −0.90 | 0.38 | 1.5346 | 56.2 |
| 4* | 4.23 | 0.24 | | |
| 5* | 0.77 | 0.48 | 1.5346 | 56.2 |
| 6* | 3.40 | 0.49 | | |
| 7* | −14.41 | 0.31 | 1.5346 | 56.2 |
| 8* | −2.73 | 0.13 | | |
| 9* | −2.47 | 0.27 | 1.6142 | 25.6 |
| 10* | 11.08 | 0.04 | | |
| 11* | 10.28 | 0.42 | 1.5346 | 56.2 |
| 12* | −1.54 | | | |

Aspherical surface data

3rd surface k = −7.2952e+000
a = 8.2593e−002, b = −3.8628e−002, c = 1.1216e−002,
d = −1.6482e−003, e = 9.3301e−005, f = 9.1826e−007

4th surface k = −8.4623e+001
a = 1.0703e−001, b = −4.8837e−002, c = 3.2315e−003,
d = 1.2418e−003, e = −3.7604e−005, f = −2.2653e−005

5th surface k = −3.5235e+000
a = 7.4952e−002, b = −1.0607e−001, c = −3.4672e−002,
d = 5.2016e−002, e = −1.0626e−002

6th surface k = −9.7572e+000
a = 2.0008e−002, b = −2.0028e−002, c = 6.8054e−004,
d = 7.8958e−002, e = −3.9562e−002

7th surface k = 3.7214e−001
a = 1.0621e−001, b = −9.4595e−003, c = 2.0391e−001,
d = −3.1096e−001

-continued

| Unit mm |
|---|

8th surface k = −4.5023e+001
a = −1.1555e−002, b = 1.8757e−001, c = −3.8287e−001,
d = 1.5204e−001

9th surface k = −3.7611e+001
a = −2.0245e−001, b = −2.3268e−002, c = 1.2746e−001,
d = 1.1058e−001, e = −2.3861e−001

10th surface k = −2.1643e+002
a = 2.1911e−002, b = −5.4176e−001, c = 1.3602e+000,
d = −1.2114e+000

11th surface k = −9.6108e+002
a = 1.5497e−001, b = −4.0951e−001, c = 1.0064e+000,
d = −6.0425e−001

12th surface k = −1.4896e+000
a = −5.4856e−003, b = 8.9888e−002, c = −1.2373e−001,
d = 4.2339e−001

| | |
|---|---|
| Focal length | 3 |
| NA | 0.21 |
| WD | 0.79 |
| Maximum image height | 0.18 |

Example 7

| Unit mm | | | | |
|---|---|---|---|---|
| Surface data | | | | |
| Surface no. | r | d | nd | vd |
| 1(ob) | ∞ | 0.17 | 1.5163 | 64.1 |
| 2 | ∞ | 1.28 | | |
| 3* | −2.83 | 0.51 | 1.5337 | 55.9 |
| 4* | 4.41 | 0.68 | | |
| 5* | 1.62 | 0.67 | 1.5240 | 50.4 |
| 6* | 5.16 | 0.62 | 1.6170 | 27.2 |
| 7* | 4.79 | 0.82 | | |
| 8* | −3.80 | 0.35 | 1.6142 | 25.6 |
| 9* | 59.08 | 0.08 | | |
| 10* | 6.36 | 1.22 | 1.5337 | 60.9 |
| 11* | −2.35 | | | |

Aspherical surface data

3rd surface k = −1.2054e+001
a = 2.1887e−002, b = −2.7506e−003, c = 3.8796e−004,
d = −1.9352e−005, e = 8.2592e−009, f = 1.3377e−008

4th surface k = 0.0000e+000
a = 6.8448e−003, b = 3.3012e−004, c = −3.2337e−004,
d = 1.9812e−005

5th surface k = −2.1483e+000
a = 2.7806e−004, b = 6.8437e−003, c = −2.0949e−003,
d = 1.9903e−004

6th surface k = −1.4101e−001
a = −1.3732e−003, b = 2.5922e−003, c = 5.7859e−004,
d = −2.7593e−005

-continued

| Unit mm |
|---|

7th surface k = 1.0316e+001
a = 6.9840e−003, b = 3.6586e−004, c = −1.4058e−003,
d = 1.0346e−003
8th surface k = 4.3350e+000
a = −2.6018e−003, b = 1.0618e−003, c = 4.4617e−004,
d = −1.6020e−003, e = 1.4011e−004
9th surface k = 2.1330e−003
a = 3.5192e−003, b = 1.8813e−003, c = 4.8401e−004,
d = −4.2478e−004
10th surface k = 1.8617e+000
a = 1.0490e−002, b = 7.5218e−003, c = 2.1415e−003,
d = 1.0498e−003
11th surface k = −9.0499e−001
a = −1.2710e−003, b = 5.2158e−004, c = 1.3057e−003,
d = 1.9679e−003

| | |
|---|---|
| Focal length | 5.5 |
| NA | 0.18 |
| WD | 1.28 |
| Maximum image height | 0.34 |

Example 8

| Unit mm | | | | |
|---|---|---|---|---|
| Surface data | | | | |
| Surface no. | r | d | nd | vd |
| 1(ob) | ∞ | 0.17 | 1.5163 | 64.1 |
| 2 | ∞ | 0.59 | | |
| 3* | 10.95 | 0.79 | 1.5307 | 55.7 |
| 4* | 1.69 | 0.69 | | |
| 5* | 1.67 | 0.34 | 1.6035 | 28.2 |
| 6* | 2.67 | 0.42 | | |
| 7* | 19.62 | 0.34 | 1.6035 | 28.2 |
| 8* | −19.55 | 0.27 | | |
| 9* | −1.42 | 0.32 | 1.6349 | 23.9 |
| 10* | −5.84 | 0.06 | | |
| 11* | 6.06 | 0.54 | 1.5307 | 55.7 |
| 12* | −1.42 | | | |

| Aspherical surface data |
|---|

3rd surface k = −6.3632e+002
a = 2.2479e−002, b = 1.6472e−003, c = 4.9949e−004,
d = −7.5157e−005
4th surface k = −1.1119e+000
a = −6.1610e−002, b = 7.8423e−003, c = −7.2282e−004,
d = 4.7832e−005
5th surface k = 3.3226e−001
a = −6.5088e−002, b = −2.7263e−002, c = 5.5793e−003,
d = −2.7152e−003

-continued

| Unit mm |
|---|

6th surface k = 9.1460e−001
a = 4.9709e−002, b = 7.5524e−002, c = 3.0336e−003,
d = 2.8298e−002
7th surface k = 1.0177e+002
a = 7.2606e−002, b = 9.2291e−002, c = −1.2539e−001,
d = −4.5273e−002
8th surface k = 4.1914e+001
a = 8.2723e−002, b = 6.5511e−002, c = −3.3606e−001,
d = 1.9090e−001
9th surface k = −9.1829e−002
a = 1.7279e−001, b = −3.0575e−001, c = 2.8927e−001,
d = −1.9949e−001
10th surface k = −1.7463e+002
a = −5.1617e−002, b = 6.2326e−002, c = −1.6727e−001,
d = 4.5229e−002
11th surface k = −1.1751e+001
a = −7.9690e−002, b = 1.0223e−001, c = −1.2552e−001,
d = −5.6534e−003
12th surface k = −1.1700e−001
a = 1.2533e−003, b = 7.2215e−003, c = 2.6487e−002,
d = −3.5646e−002

| | |
|---|---|
| Focal length | 4.3 |
| NA | 0.20 |
| WD | 0.59 |
| Maximum image height | 0.26 |

Example 9

| Unit mm | | | | |
|---|---|---|---|---|
| Surface data | | | | |
| Surface no. | r | d | nd | vd |
| 1(ob) | ∞ | 0.17 | 1.5163 | 64.1 |
| 2 | ∞ | 1.04 | | |
| 3* | −1.58 | 0.50 | 1.5337 | 55.9 |
| 4* | 6.32 | 0.32 | | |
| 5* | 1.13 | 0.53 | 1.5240 | 50.4 |
| 6* | 5.38 | 0.40 | 1.6170 | 27.2 |
| 7* | 4.14 | 0.63 | | |
| 8* | −2.88 | 0.35 | 1.6142 | 25.6 |
| 9* | 14377.94 | 0.05 | | |
| 10* | 5.97 | 1.08 | 1.5337 | 55.9 |
| 11* | −1.86 | | | |

| Aspherical surface data |
|---|

3rd surface k = −9.4343e+000
a = 5.5641e−002, b = −1.3690e−002, c = 3.1786e−003,
d = −2.7276e−004, e = −9.7009e−007, f = 9.6475e−007,
4th surface k = 0.0000e+000
a = 5.0196e−002, b = −5.2961e−003, c = −2.4022e−003,
d = 3.5040e−004,

-continued

Unit mm

5th surface k = −3.4281e+000
a = 6.3824e−002, b = −1.0565e−002, c = 3.1794e−003,
d = −2.3892e−003

6th surface k = 1.2640e+001
a = −6.4902e−003, b = 1.7414e−002, c = 1.8720e−002,
d = −1.2693e−002

7th surface k = 1.1806e+001
a = 2.5099e−003, b = 2.1903e−002, c = −8.9325e−003,
d = 8.0857e−004

8th surface k = −6.3806e−001
a = −1.5003e−003, b = 7.3876e−004, c = 4.2816e−003,
d = −1.8874e−002, e = 5.0296e−003

9th surface k = −1.0000e−006
a = 6.1011e−002, b = 1.7715e−002, c = −1.8570e−002,
d = −1.7626e−003

10th surface k = −1.1323e+000
a = 4.7125e−002, b = 2.1068e−002, c = −9.0519e−003,
d = 6.5676e−003

11th surface k = −6.0790e−001
a = −5.3781e−003, b = 1.3085e−002, c = −1.9077e−002,
d = 1.8726e−002

| Focal length | 4.2 |
|---|---|
| NA | 0.24 |
| WD | 1.04 |
| Maximum image height | 0.26 |

Example 10

Unit mm

Surface data

| Surface no. | r | d | nd | vd |
|---|---|---|---|---|
| 1(ob) | ∞ | 0.17 | 1.5163 | 64.1 |
| 2 | ∞ | 0.89 | | |
| 3* | −0.90 | 0.38 | 1.5346 | 56.2 |
| 4* | 4.23 | 0.24 | | |
| 5* | 0.77 | 0.48 | 1.5346 | 56.2 |
| 6* | 3.40 | 0.10 | | |
| 7* | 8.35 | 0.25 | 1.5346 | 56.2 |
| 8* | −10.21 | 0.19 | | |
| 9* | −8.16 | 0.31 | 1.5346 | 56.2 |
| 10* | −4.37 | 0.13 | | |
| 11* | −2.47 | 0.27 | 1.6142 | 25.6 |
| 12* | 11.08 | 0.04 | | |
| 13* | 10.28 | 0.42 | 1.5346 | 56.2 |
| 14* | −1.54 | | | |

Aspherical surface data

3rd surface k = −7.2952e+000
a = 8.2593e−002, b = −3.8628e−002, c = 1.1216e−002,
d = −1.6482e−003, e = 9.3301e−005, f = 9.1826e−007

4th surface k = −8.4623e+001
a = 1.0703e−001, b = −4.8837e−002, c = 3.2315e−003,
d = 1.2418e−003, e = −3.7604e−005, f = −2.2653e−005

5th surface k = −3.5235e+000
a = 7.4952e−002, b = −1.0607e−001, c = −3.4672e−002,
d = 5.2016e−002, e = −1.0626e−002

6th surface k = −9.7572e+000
a = 2.0008e−002, b = −2.0028e−002, c = 6.8054e−004,
d = 7.8958e−002, e = −3.9562e−002

7th surface k = 1.2957e+002
a = −6.6967e−002, b = −3.9484e−001, c = −4.2037e−001,
d = 1.2865e+000

8th surface k = −1.8875e+003
a = −1.3204e−001, b = −2.6347e−001, c = −3.8328e−001,
d = 6.9353e−001

9th surface k = −1.1737e+003
a = 1.5225e−001, b = 8.2861e−002, c = 2.6467e−001,
d = −1.5780e+000

10th surface k = −1.9604e+002
a = 1.4629e−001, b = 3.8230e−001, c = −5.7452e−001,
d = −4.8968e−001

11th surface k = −3.7611e+001
a = −2.0245e−001, b = −2.3268e−002, c = 1.2746e−001,
d = 1.1058e−001, e = −2.3861e−001

12th surface k = −2.1643e+002
a = 2.1911e−002, b = −5.4176e−001, c = 1.3602e+000,
d = −1.2114e+000

13th surface k = −9.6108e+002
a = 1.5497e−001, b = −4.0951e−001, c = 1.0064e+000,
d = −6.0425e−001

14th surface k = −1.4896e+000
a = −5.4856e−003, b = 8.9888e−002, c = −1.2373e−001,
d = 4.2339e−001

| Focal length | 3 |
|---|---|
| NA | 0.21 |
| WD | 0.89 |
| Maximum image height | 0.18 |

Imaging lens

| Surface no. | r | d | nd | vd |
|---|---|---|---|---|
| 1 | 68.75 | 7.73 | 1.4875 | 70.2 |
| 2 | −37.57 | 3.47 | 1.8061 | 40.9 |
| 3 | −102.85 | 0.70 | | |
| 4 | 84.31 | 6.02 | 1.8340 | 37.2 |
| 5 | −50.71 | 3.03 | 1.6445 | 40.8 |
| 6 | 40.66 | | | |

| Focal length | 180 |
|---|---|

Next, values of each in examples of conditional expressions (1)-(4) are shown below:

| Conditional expressions | Example 1 | Example 2 | Example 3 | Example 4 |
|---|---|---|---|---|
| (1) | 0.17 | 0.21 | 0.16 | 0.17 |
| (2) | 15.8 | 13.3 | 28.3 | 11.0 |
| (3) | 1.75 | 1.65 | 0.64 | 1.73 |
| (4) | 0.60 | 0.56 | 1.26 | 0.42 |

| Conditional expressions | Example 5 | Example 6 | Example 7 | Example 8 |
|---|---|---|---|---|
| (1) | 0.14 | 0.21 | 0.18 | 0.20 |
| (2) | 14.5 | 8.9 | 18.7 | 11.7 |
| (3) | 2.07 | 2.07 | 2.13 | 1.62 |
| (4) | 0.51 | 0.62 | 0.61 | 0.54 |

| Conditional expressions | Example 9 | Example 10 |
|---|---|---|
| (1) | 0.24 | 0.21 |
| (2) | 11.9 | 10.2 |
| (3) | 2.85 | 2.98 |
| (4) | 0.68 | 0.71 |

Aberration diagrams of the embodiments from the first embodiment to the tenth embodiment are shown in FIG. 2A to FIG. 2D, FIG. 4A to FIG. 4D, FIG. 6A to FIG. 6D, FIG. 8A to FIG. 8D, FIG. 10A to FIG. 10D, FIG. 12A to FIG. 12D, FIG. 14A to FIG. 14D, FIG. 16A to FIG. 16D, FIG. 18A to FIG. 18D, and FIG. 20A to FIG. 20D. In each of the abovementioned aberration diagrams, 'NA' denotes a numerical aperture on the object side and 'FIY' denotes the maximum image height. An aberration in each of the aberration diagrams of the embodiments from the first embodiment to the tenth embodiment is an aberration at (on) an object surface (specimen surface) when a light ray is made to be incident from a tube-lens side.

Figure 4A:
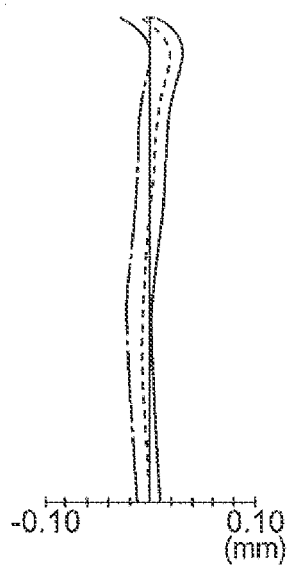
FIG. 4A, FIG. 4B, FIG. 4C, and FIG. 4D (hereinafter, 'FIG. 4A to FIG. 4D') are aberration diagrams of the microscope objective lens according to the second embodiment.
Figure 4B:
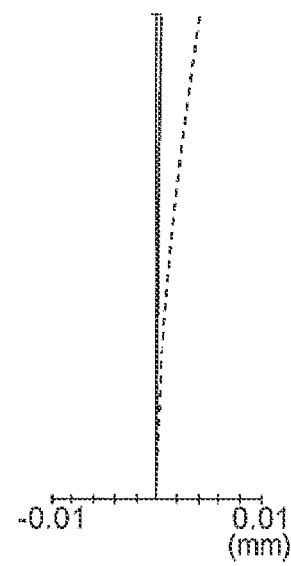
Figure 4C:
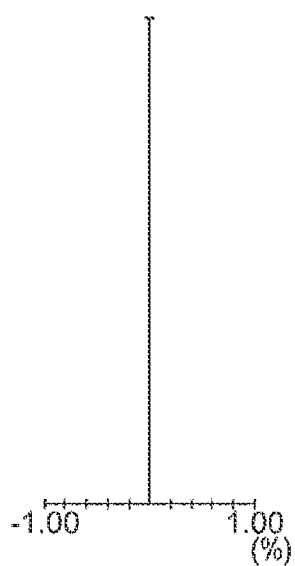
Figure 4D:
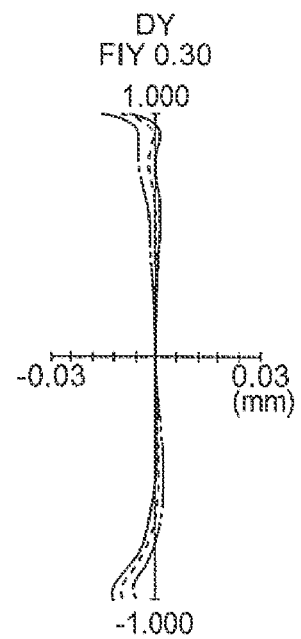
Figure 6A:
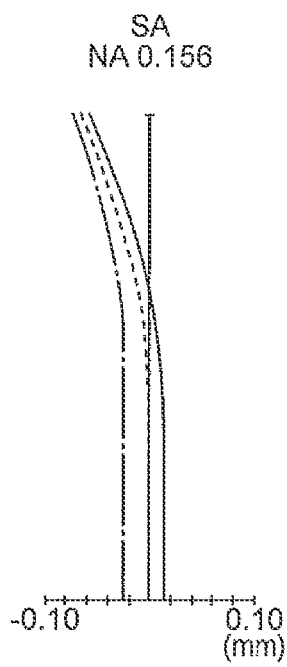
FIG. 6A, FIG. 6B, FIG. 6C, and FIG. 6D (hereinafter, 'FIG. 6A to FIG. 6D') are aberration diagrams of the microscope objective lens according to the third embodiment.
Figure 6B:
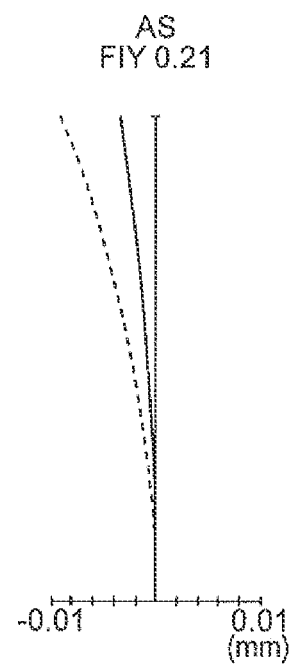
Figure 6C:
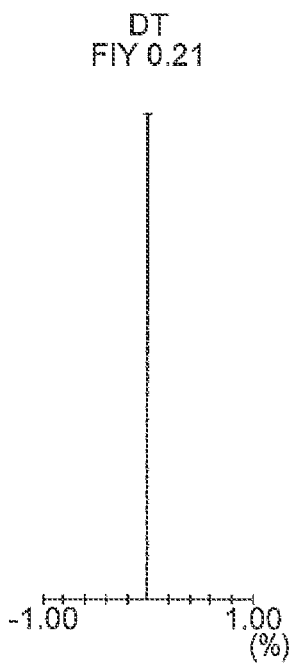
Figure 6D:
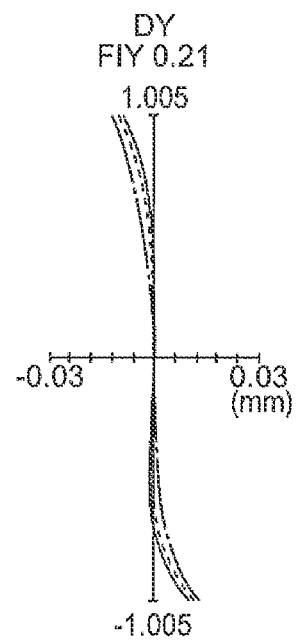
Figure 20A:
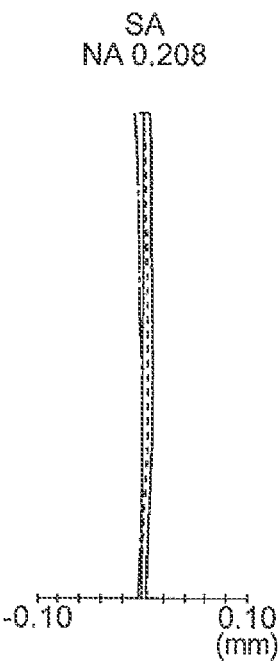
FIG. 20A, FIG. 20B, FIG. 20C, and FIG. 20D (hereinafter, 'FIG. 20A to FIG. 20D') are aberration diagrams of the microscope objective lens according to the tenth embodiment.
Figure 20B:
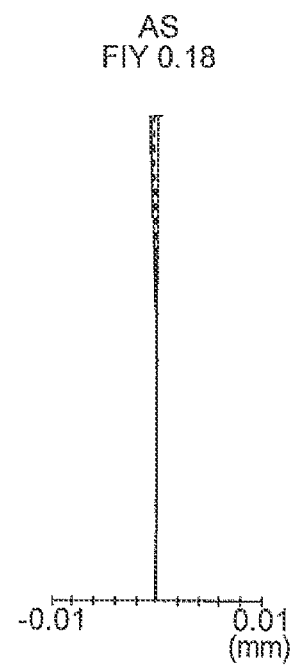
Figure 20C:
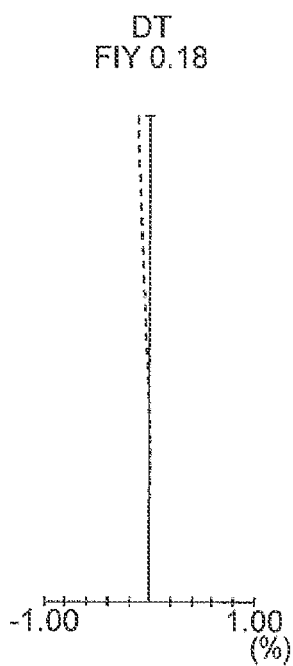
Figure 20D:
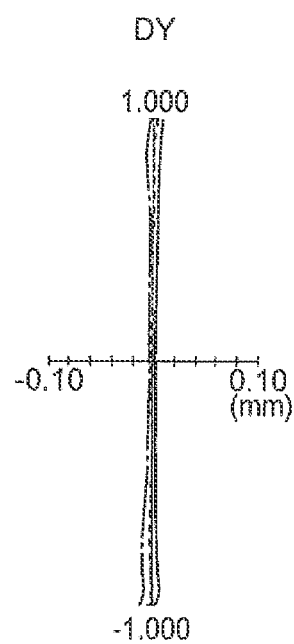

In the abovementioned aberration diagrams, diagrams which are assigned numbers with suffix A, such as FIG. 2A, FIG. 4A, FIG. 6A, ..., FIG. 20A show spherical aberration (SA), diagrams which are assigned numbers with suffix B, such as FIG. 2B, FIG. 4B, FIG. 6B, ..., FIG. 20B show astigmatism (AS), diagrams which are assigned numbers with suffix C, such as FIG. 2C, FIG. 4C, FIG. 6C, ..., FIG. 20C show distortion (DT), and diagrams which are assigned numbers with suffix D, such as FIG. 2D, FIG. 4D, FIG. 6D, ..., FIG. 20D show oblique transverse aberration (off-axis transverse aberration) (DY).

FIG. 21 is a cross-sectional view of the tube lens. FIG. 22 is a lens cross-sectional view when the tube lens and the microscope objective lens according to the first embodiment are combined.

Figure 23:
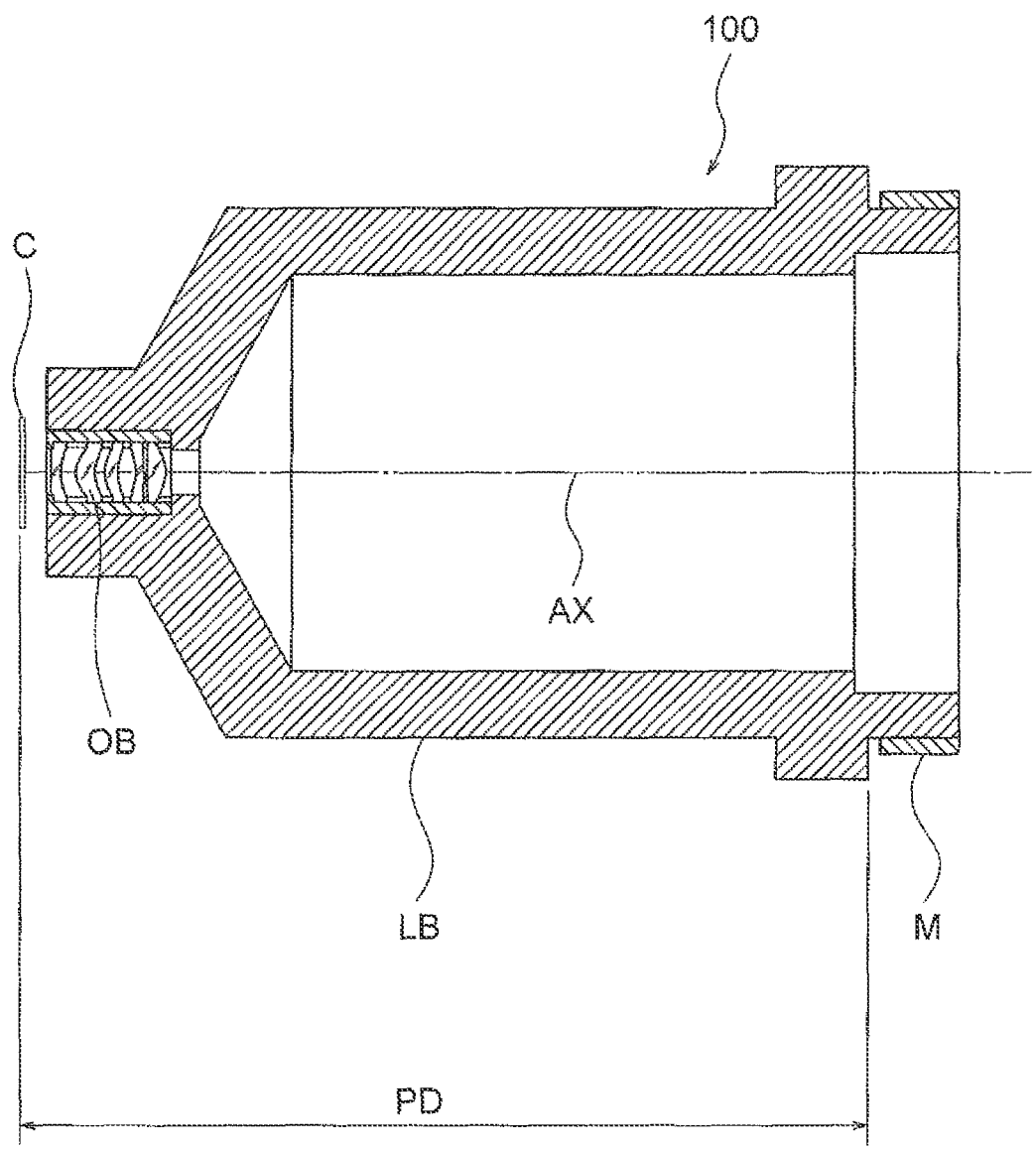
FIG. 23 is a cross-sectional view of a microscope objective lens unit.

FIG. 23 is a cross-sectional view of a microscope objective lens unit 100. The microscope objective lens unit 100 includes a lens barrel LB, a microscope objective lens OB which is accommodated in one end portion of the lens barrel LB, and a detaching portion M which is formed at the other end of the lens barrel LB, and is detachable from the observation apparatus.

In FIG. 23, PD denotes a parfocalizing distance. The parfocalizing distance of a microscope objective lens is stipulated by Japanese Industrial Standards (JIS). Concretely, in a case of no cover glass, the parfocalizing distance is stipulated to be PD=45+15 m (m=−1, 0, 1, 2, 3, 4). In a case of having a cover glass, the parfocalizing distance is given by adding t (n−1/n) to the parfocalizing distance PD in the case of no cover glass. For instance, in a case in which, the parfocalizing distance is 45 mm, PD is stipulated to be PD=[45+t(n−1/n)]. Here, t denotes the thickness of the cover glass, and n denotes the refractive index of the cover glass.

In the microscope objective lens according to the first embodiment, since a length from a first lens up to a fifth lens is 4.21 mm, in a case in which, the parfocalizing distance is 45 mm for example, a proportion in the parfocalizing distance of the microscope objective lens according to the first embodiment becomes 1/10 approximately. In such manner, the microscope objective lens according to the present invention has a length of an optical system which is shorter than a length of an optical system in a conventional microscope objective lens. In FIG. 23, a scale of an objective lens, and a scale of a holding member which holds the objective lens are not same.

As it has been described above, the microscope objective lens according to the present invention is useful from a point that it is possible to suppress a loss of amount of light which is incident.

According to the present invention, it is possible to provide a microscope objective lens in which, the loss of amount of light which incident is small.

What is claimed is:

1. A microscope objective lens, wherein the microscope objective lens satisfies the following conditional expressions (1) and (2)

$$0.05 < NA < 0.4 \quad (1)$$

$$3\text{ mm} < D/NA < 50\text{ mm} \quad (2)$$

where,

NA denotes a numerical aperture on an object side of the microscope objective lens, and D denotes a sum of thicknesses of all lenses included in the microscope objective lens, and wherein a parfocalizing distance PD of the microscope objective lens is calculated by the following expression (5)

$$PD = 45 + 15\text{ m} \quad (5)$$

where, m is −1, 0, 1, 2, 3, or 4.

2. The microscope objective lens according to claim 1, wherein the microscope objective lens satisfies the following conditional expression (3)

$$0.5 < D/AD < 7 \quad (3)$$

where,

D denotes the sum of thicknesses of all lenses included in the microscope objective lens, and AD denotes a sum of air spaces between lenses of the microscope objective lens.

3. The microscope objective lens according to claim 1, wherein the microscope objective lens satisfies the following conditional expression (4)

$$0.2 < D/f < 2 \quad (4)$$

where,

D denotes the sum of thicknesses of all lenses included in the microscope objective lens, and F denotes a focal length of the overall microscope objective lens system.

4. The microscope objective lens according to claim 1, wherein a lens which forms the microscope objective lens is made of at least two types of glass, and a refractive index of the lens for a d-line is not more than 1.7.

5. The microscope objective lens according to claim 1, wherein the microscope objective lens is accommodated in a microscope objective lens unit, and the microscope objective lens unit has a detaching portion which is detachable from an observation apparatus.

* * * * *